United States Patent
Been et al.

(10) Patent No.: US 9,009,905 B2
(45) Date of Patent: Apr. 21, 2015

(54) PIPE PIG AND METHOD OF CLEANING A PIPE

(75) Inventors: Jantje Been, Edmonton (CA); Baotong Lu, Edmonton (CA); David Crick, Edmonton (CA); Guenther Metzker, Edmonton (CA)

(73) Assignee: On Stream Technologies Inc., Calgary (CA)

( * ) Notice: Subject to any disclaimer, the term of this patent is extended or adjusted under 35 U.S.C. 154(b) by 753 days.

(21) Appl. No.: 13/056,968

(22) PCT Filed: Jul. 31, 2009

(86) PCT No.: PCT/CA2009/001056
§ 371 (c)(1),
(2), (4) Date: May 2, 2011

(87) PCT Pub. No.: WO2010/012087
PCT Pub. Date: Feb. 4, 2010

(65) Prior Publication Data
US 2011/0203676 A1    Aug. 25, 2011

Related U.S. Application Data

(60) Provisional application No. 61/085,404, filed on Jul. 31, 2008.

(51) Int. Cl.
*B08B 9/04* (2006.01)
*F28G 1/10* (2006.01)
*B08B 9/055* (2006.01)
*F16L 101/12* (2006.01)
*F28D 21/00* (2006.01)

(52) U.S. Cl.
CPC .............. *F28G 1/10* (2013.01); *B08B 9/0553* (2013.01); *F16L 2101/12* (2013.01); *F28D 2021/0059* (2013.01)

(58) Field of Classification Search
CPC ........................... B08B 9/0553; B08B 9/0557
USPC ................. 15/104.061, 104.062, 104.063
See application file for complete search history.

(56) References Cited

U.S. PATENT DOCUMENTS

| 4,538,316 A | 9/1985 | Reinhart et al. |
| 5,150,493 A | 9/1992 | Sivacoe |

(Continued)

FOREIGN PATENT DOCUMENTS

CA    2530932 A1 *  6/2007

OTHER PUBLICATIONS

International Search Report mailed Oct. 7, 2009, issued in corresponding International Application No. PCT/CA2009/001056, filed Jul. 31, 2009, 2 pages.

*Primary Examiner* — Michael Kornakov
*Assistant Examiner* — Douglas Lee
(74) *Attorney, Agent, or Firm* — Christensen O'Connor Johnson Kindness PLLC

(57) ABSTRACT

A pipe pig for refinery heater tubes is disclosed. The pipe pig has arcuate cleaning elements which form an expandable circumference. Each of the arcuate cleaning elements has a scraping edge. A spring element biases the arcuate cleaning elements radially outward. The pipe pig may have structural components made from titanium alloys and arcuate cleaning elements made from carbon-carbon composites. A method for cleaning coking out of refinery heater tubes using the pipe pig is also disclosed.

7 Claims, 14 Drawing Sheets

(56) References Cited

U.S. PATENT DOCUMENTS

| | | |
|---|---|---|
| 5,265,302 A | 11/1993 | Sivacoe |
| 5,318,074 A | 6/1994 | Sivacoe |
| 5,358,573 A | 10/1994 | Sivacoe |
| 5,368,109 A * | 11/1994 | Pittard et al. .................... 175/45 |
| 5,379,475 A | 1/1995 | Sivacoe |
| 5,437,073 A * | 8/1995 | Smith ...................... 15/104.061 |
| 5,685,041 A | 11/1997 | Sivacoe |
| 5,797,993 A * | 8/1998 | Woehleke ......................... 134/8 |
| 6,170,493 B1 | 1/2001 | Sivacoe |
| 6,359,645 B1 | 3/2002 | Sivacoe |
| 6,381,797 B1 | 5/2002 | Filippovitch |
| 6,391,121 B1 | 5/2002 | Sivacoe |
| 6,569,255 B2 | 5/2003 | Sivacoe |
| 6,792,641 B1 * | 9/2004 | Laker ...................... 15/104.061 |
| 2001/0010104 A1 * | 8/2001 | Couchman et al. ...... 15/104.061 |
| 2002/0185261 A1 | 12/2002 | Sivacoe |
| 2006/0107527 A1 * | 5/2006 | Tye ........................ 29/896.412 |

* cited by examiner

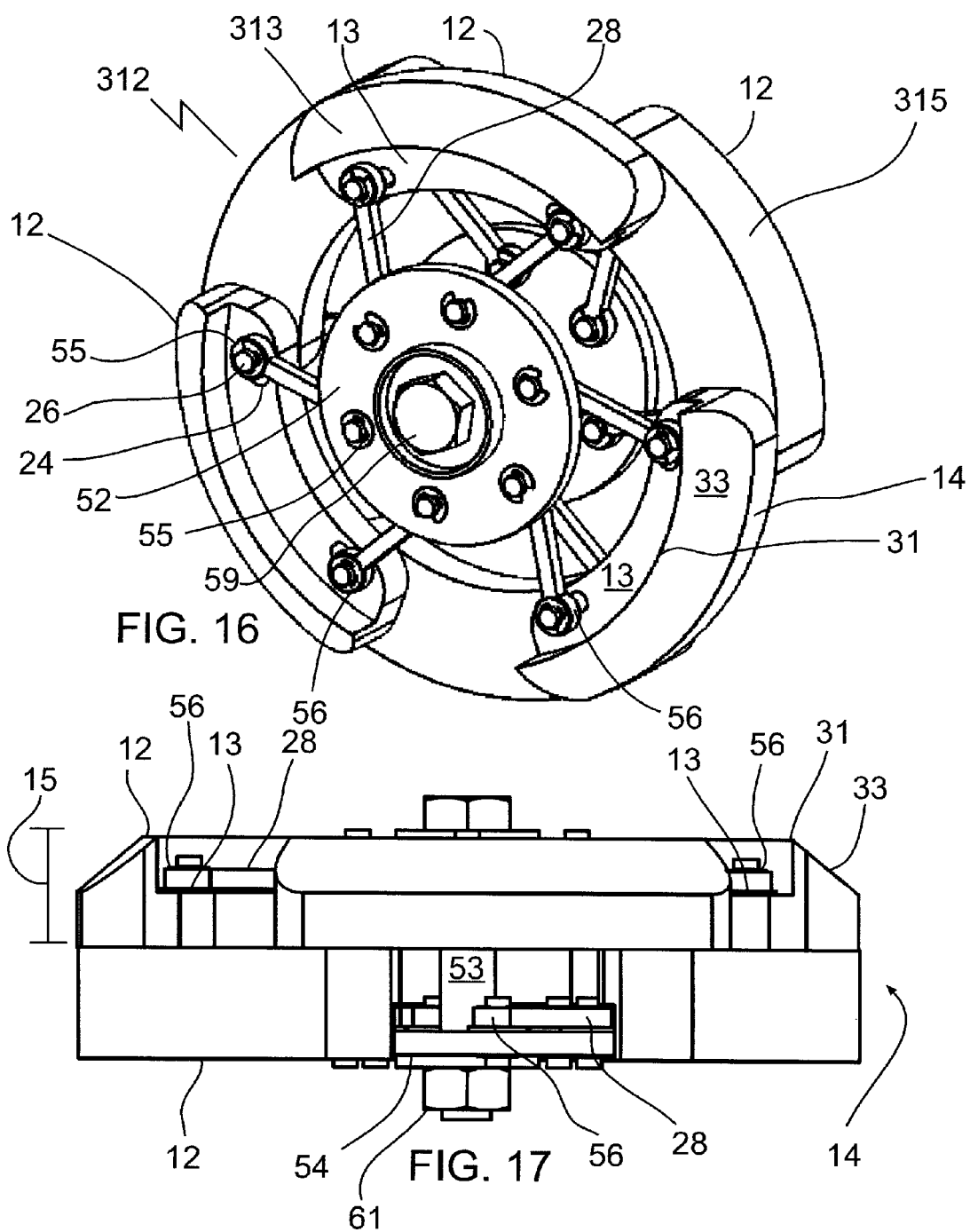

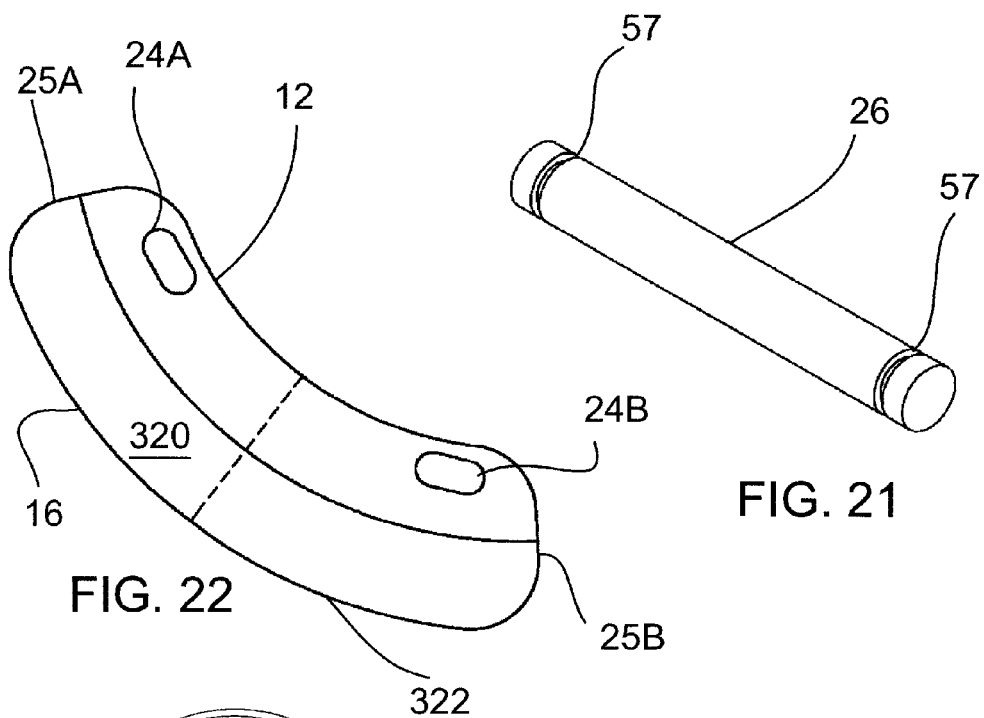
FIG. 21
FIG. 22
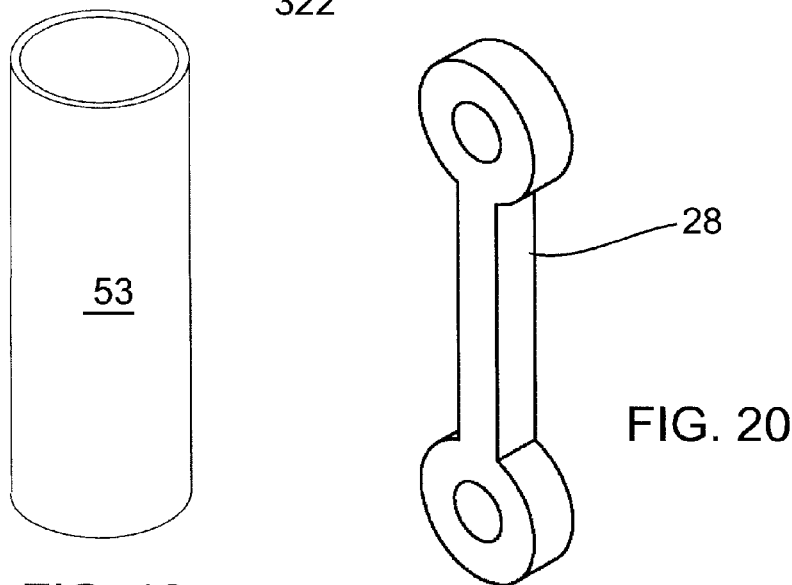
FIG. 19
FIG. 20

PIPE PIG AND METHOD OF CLEANING A PIPE

TECHNICAL FIELD

This relates to an apparatus and method used for cleaning tubes, particularly tubes of a heater.

BACKGROUND

Heaters are used in petrochemical installations to heat fluids for a variety of purposes, typically to break apart larger hydrocarbon molecules into smaller molecules. The heaters contain tubes, up to and even more than a kilometer long, that pass first through a convection section of a heater then through a radiant section. During use, the heater tubes gradually become contaminated on their insides. This contamination, typically coke, tends to degrade the efficiency of the heater over time, which can lead to economic loss and can eventually cause the heater to stop working.

Various methods are known for decoking heaters. Coke is often removed by mechanical means, which requires a system shut down. Many pig designs cannot operate without significant disturbance to heater operation or are unable to withstand high temperatures of up to 500 C and, in some cases, up to 900 C in heater pipes. Some pig designs are inflexible and so are unable to accommodate small changes in pipe diameter and unable to traverse through 180-degree bends. Most pigging designs are too heavy or result in a significant pressure drop in the heater making their use during heater operation undesirable. Also, many pig designs fail to consider the change in fluid velocity as the pig passes through the heat exchanger. Many materials used for pig designs have temperature limitations or high densities, which make the designs unmanageable during heater operation.

SUMMARY

There is provided a pipe pig suitable for cleaning an operating heater or heat exchanger. In an embodiment, the pipe pig has arcuate cleaning elements forming an expandable circumference. Each of the arcuate cleaning elements has a scraping edge. A spring element biases the arcuate cleaning elements radially outward.

In another embodiment, the pipe pig has a pressure responsive expander comprising a set of levers connected to arcuate cleaning elements. The arcuate cleaning elements form an expandable circumference and each of the arcuate cleaning elements have at least one scraping edge The levers are spring biased to cause, in operation, the expandable circumference to expand and contract in response to varying pressure on the pressure responsive expander.

Methods of cleaning tubing in an operating heater or heat exchanger. In one embodiment the method comprises the step of running a pig defining an expandable circumference having a scraping action through the tubing. The scraping action is caused by arcuate cleaning elements forming the expandable circumference. Each of the arcuate cleaning elements has a scraping edge and the arcuate cleaning elements are biased radially outward.

In another embodiment, the method comprises the step of running a pig having an expandable circumference with a scraping action through the tubing, in which the scraping action is caused by arcuate cleaning elements forming the expandable circumference. Each of the arcuate cleaning elements has at least one scraping edge and the arcuate cleaning elements are expanded or contracted in responsive to pressure from the fluid flow in the tubing acting on a pressure responsive expander.

In another embodiment, a cleaning element for a pipe pig is disclosed, the cleaning element comprising: an arcuate body having a scraping edge on an outer circumferential surface of the arcuate body; and axial slits, one of the axial slits being near an end of an arc defined by the arcuate body, and another of the axial slits being near the other end of the arc, the axial slits being for receiving sliding pin joints.

In various embodiments, there may be included any one or more of the following features: Each of the arcuate cleaning elements may have a serrated external surface. The arcuate cleaning elements may be made from a carbon-carbon composite material. The pig may be hollow. The arcuate cleaning elements may be linked by circumferentially sliding connectors. The adjacent arcuate cleaning elements may be connected by sliding pin joints. The pipe pig may comprise respective plates spaced axially on opposed sides of the expandable circumference, the respective plates being spring biased to cause, in operation, the expandable circumference to expand and contract. The respective plates may be respective pressure plates spring biased to cause, in operation, the expandable circumference to expand and contract in response to varying pressure on the respective pressure plates. The respective plates may be respective radial plates spring biased to rotate with respect to one another to cause, in operation, the expandable circumference to expand and contract in response to varying radial pressure on the expandable circumference. The spring element may connect the respective plates together and the spring element biases the arcuate elements radially outward. The adjacent arcuate cleaning elements may be connected by sliding pin joints, and levers may be connected between the respective plates and the sliding pin joints of each linked pair of arcuate cleaning elements. The levers may be made from titanium alloys. The expandable circumference may have an outward taper from a leading edge of the expandable circumference. The pig may be made of a material capable of maintaining its structural form at temperatures up to 500 C, and in some embodiments up to 900 C. The spring element may be made from titanium alloys. There may be a number N of arcuate cleaning elements and the arcuate cleaning elements have centers spaced at intervals of 360/N degrees around the expandable circumference. The arcuate cleaning elements may comprise a first set of arcuate cleaning elements and the pipe pig may further comprise a second set of cleaning elements forming a second expandable circumference, the second set of cleaning elements being connected to the first set of cleaning elements. The pipe pig may be connected in series to a second pipe pig. The pipe pig and the second pipe pig may be connected by a spring element. The pipe pig may include a pressure responsive expander. The pressure responsive expander may comprise a set of levers connected to the arcuate cleaning elements, the levers being spring biased to cause, in operation, the expandable circumference to expand and contract in response to varying pressure on the pressure responsive expander. The pressure responsive expander may further comprise respective pressure plates spaced axially on opposed sides of the expandable circumference, the respective pressure plates being connected by the levers to the arcuate cleaning elements. The levers may be spring biased by a spring element connecting the respective pressure plates together. The spring element and levers may be made from titanium alloys. The arcuate cleaning elements may be slidably connected to each other and form linked pairs of arcuate cleaning elements. The linked pairs of arcuate cleaning elements may be connected by sliding pin joints. The arcuate cleaning elements may be made from a carbon-carbon composite material.

In various embodiments of the methods, there may be included any one or more of the following features: The tubing may be tubing in a heater and the step of running the pig through the tubing may be carried out repeatedly. The method may be carried out while the heater is in operation. The pig may be run through the heating tubing after contaminant has formed on the inside of the heater but before the contaminant has hardened. The step of running a pig through the tubing may further comprise running a plurality of connected pigs through the tubing. The expandable circumference may be biased radially outward when the pressure from the fluid flow on the pressure responsive expander increases.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 16 shows a perspective view of the leading end of the radial pipe pig of FIG. 15;

FIG. 17 shows an end elevation view of the radial pipe pig of FIG. 15;

FIG. 19 shows a center spacer used in the radial pipe pig of FIG. 15;

FIG. 20 shows a lever that may be used in the pipe pigs disclosed herein;

FIG. 21 shows a link pin that may be used in the pipe pigs disclosed herein;

FIG. 22 shows an arcuate cleaning element used in the radial pipe pig of FIG. 15.

DETAILED DESCRIPTION

In this patent document the term "arcuate" means curved in a manner that is suitable for cleaning an interior of a pipe. An arcuate cleaning element may be for example an element forming an arc of circle, an arc of an ellipse or an arc of a parabola.

Figure 2:
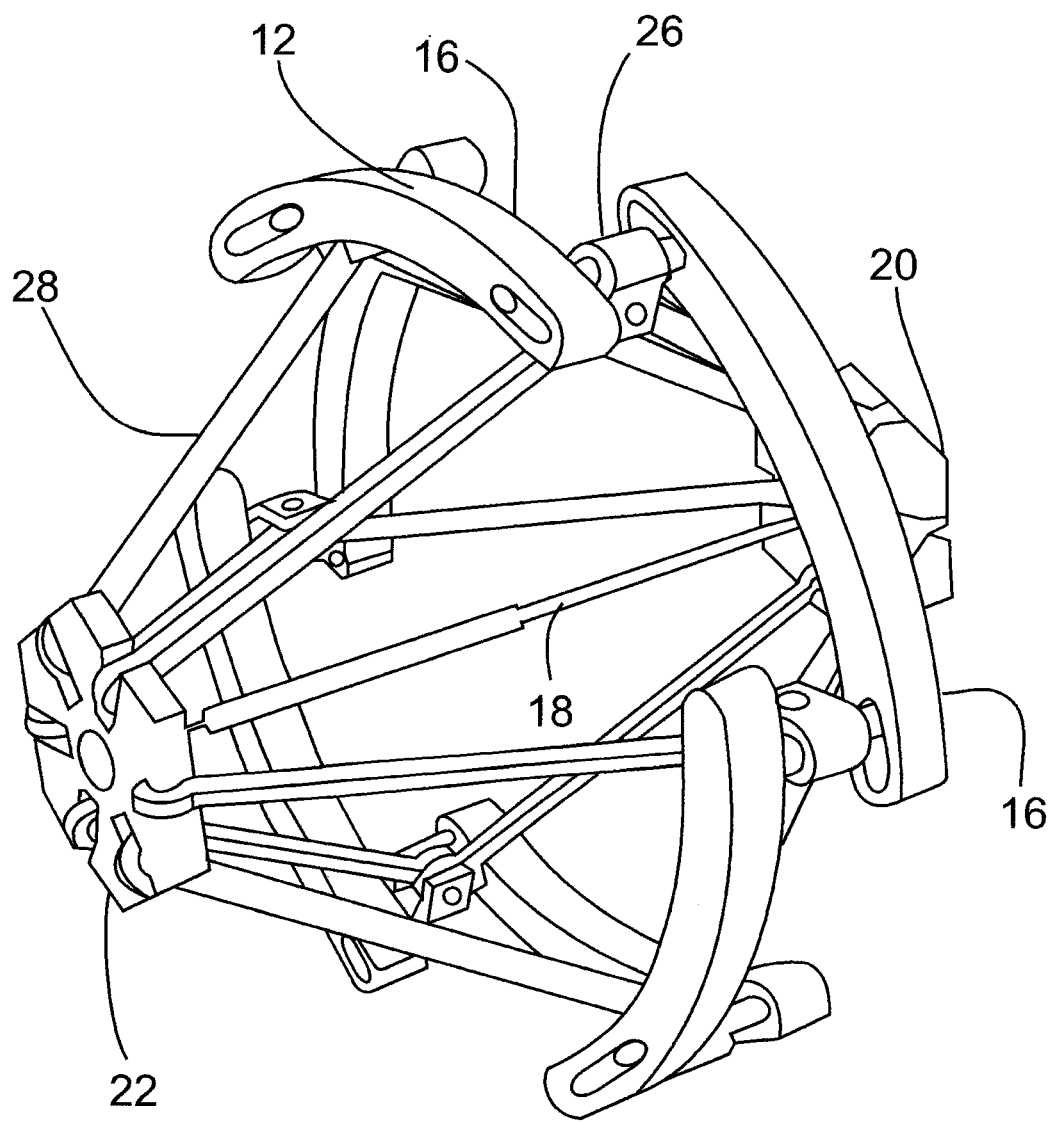
FIG. 2 is a perspective view of the pipe pig of the embodiment of FIG. 1 in a compressed position.
Figure 3A:
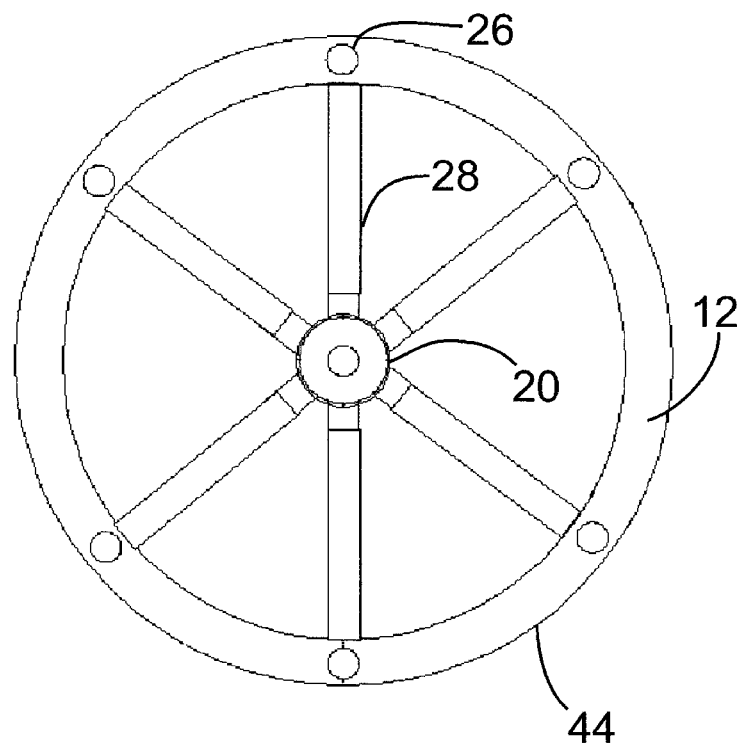
FIG. 3A is an end view of a pipe pig with a serrated external surface.
Figure 3B:
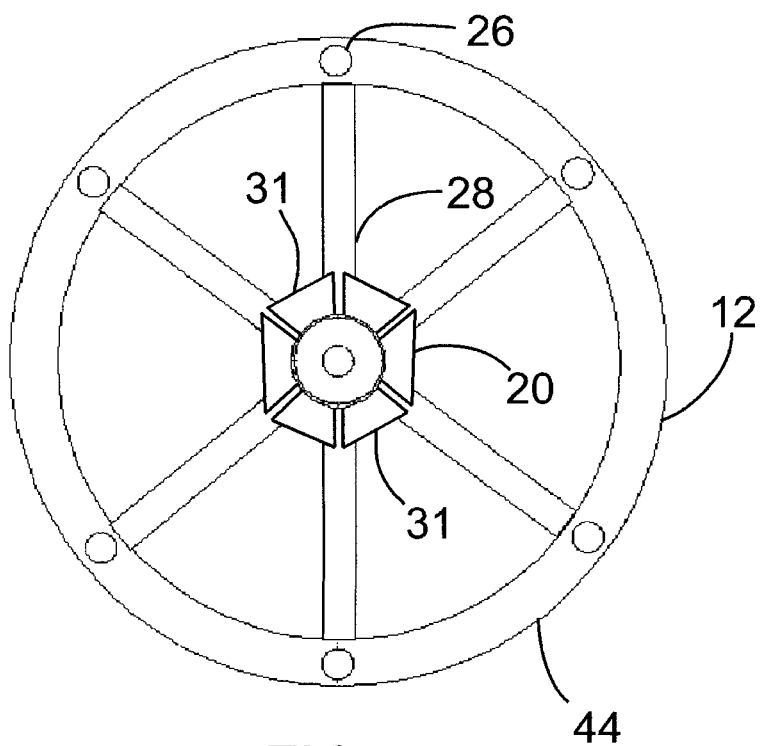
FIG. 3B is an end view of a pipe pig with flaps.
Figure 4:
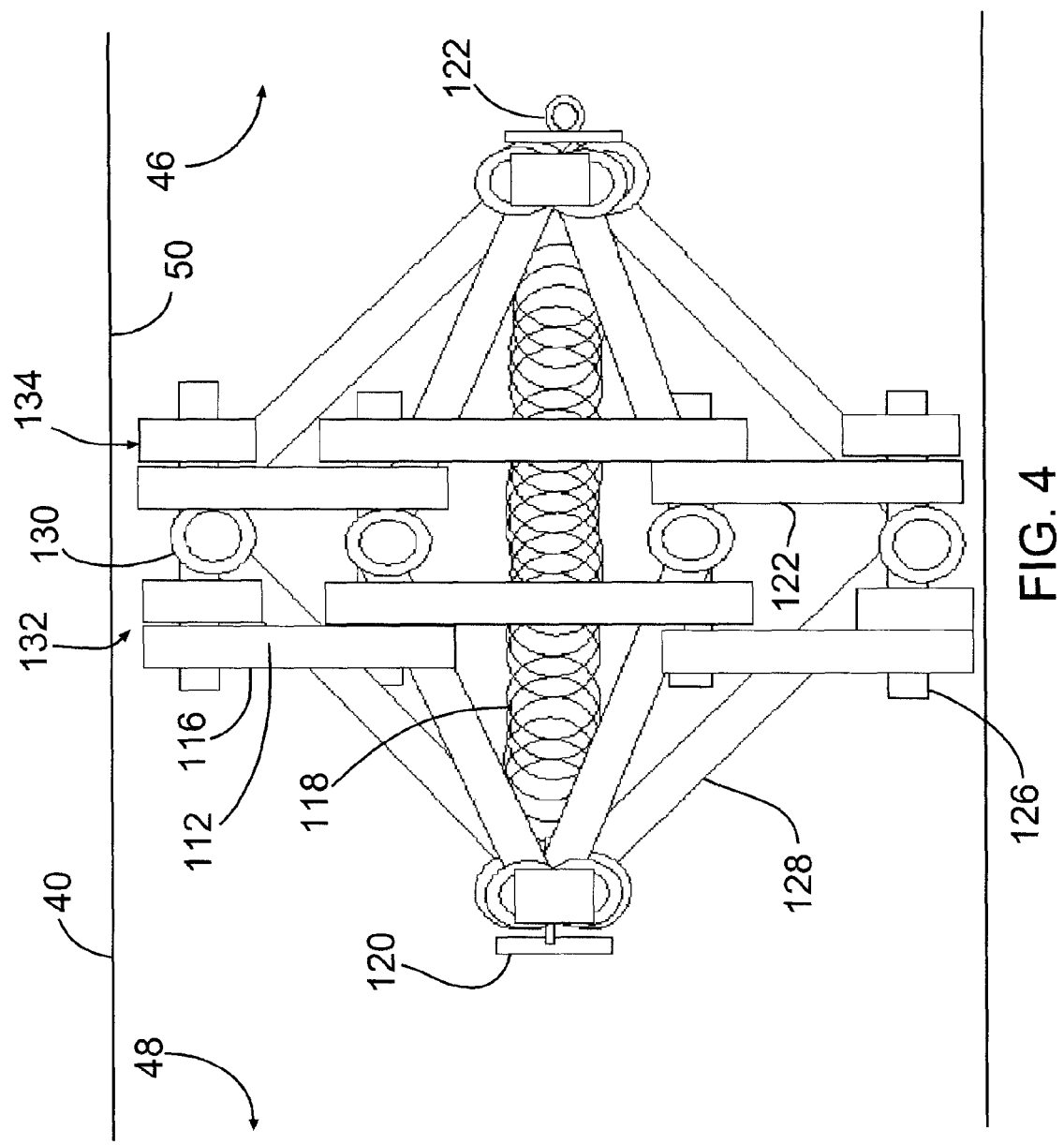
FIG. 4 is side view of a pipe pig with multiple rings of arcuate cleaning elements.
Figure 15:
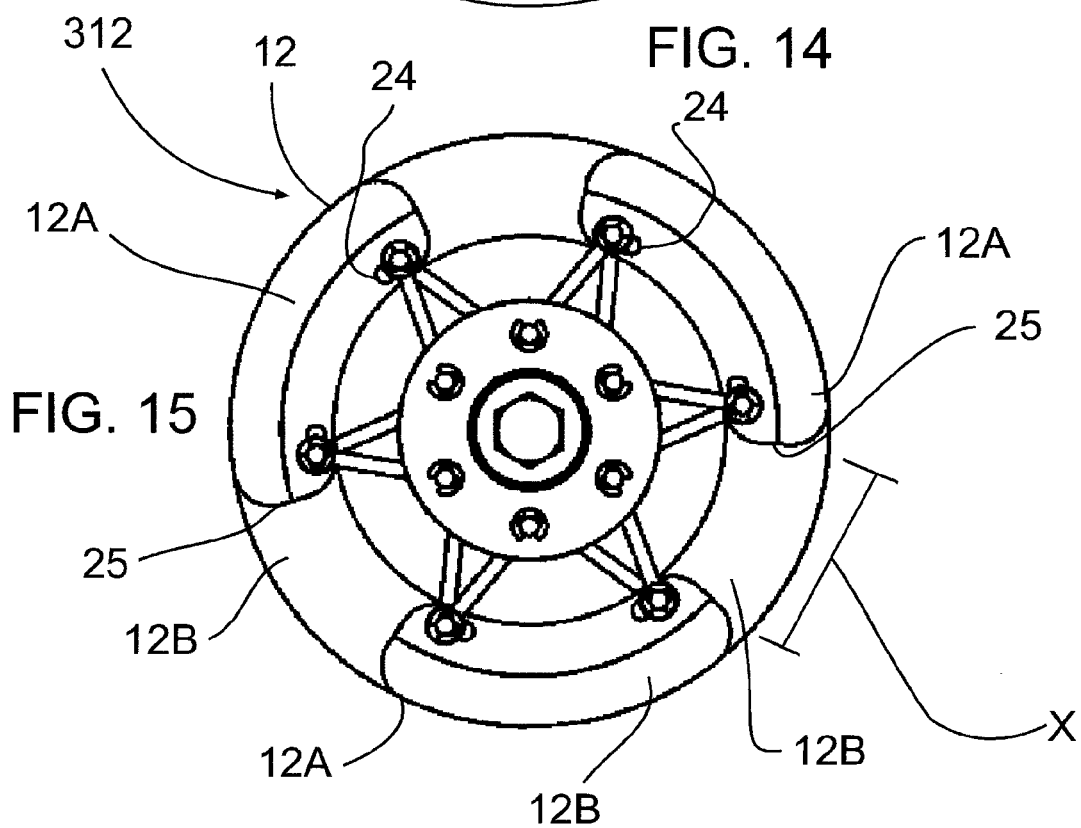
FIG. 15 shows a side elevation view of another embodiment of a radial pipe pig.

Referring to FIGS. 1-3B, a pipe pig 10 is shown in a pipe 40 (FIG. 4). The pipe pig 10 has six arcuate cleaning elements 12 forming an expandable circumference denoted generally by 14. Each of the arcuate cleaning elements 12 has a scraping edge 16, which may itself be a rounded, slanted, or angular surface. A spring element 18 biases the arcuate cleaning elements 12 radially outward. Respective plates, such as pressure plates 20, 22, are spaced axially on opposed sides of the expandable circumference 14. Referring to FIGS. 3B, 10, 16, and 23, various styles of plates are illustrated. Referring to FIGS. 1-3B, each of the arcuate cleaning elements 12 has slits 24 on opposite ends of an outer arc defined by each of the arcuate cleaning elements 12. A pin 26 is inserted through slits 24 on linked pairs of the arcuate cleaning elements 12. The pin 26 together with the slits 24 on linked pairs of the arcuate cleaning elements together form a sliding pin joint between the arcuate cleaning elements 12. Each of the two pressure plates 20, 22 are connected to the expandable circumference 14 by six levers 28 that connect to yokes 30. Referring to FIG. 20, an exemplary lever 28 that is used in the embodiment of FIG. 15 is illustrated. The length of the levers 28 may be a suitable length that is long enough to prevent the elements 12 from locking up upon compression of the expandable circumference. Referring to FIGS. 1-3B, each of the yokes 30 lies on one of the pins 26. The plates may be spring biased to cause, in operation, the expandable circumference to expand and contract. To this end, pressure plates 20, 22 are connected to one another by the spring element 18. Varying pressure on the respective pressure plates may cause the expandable circumference to expand and contract.

Figure 14:
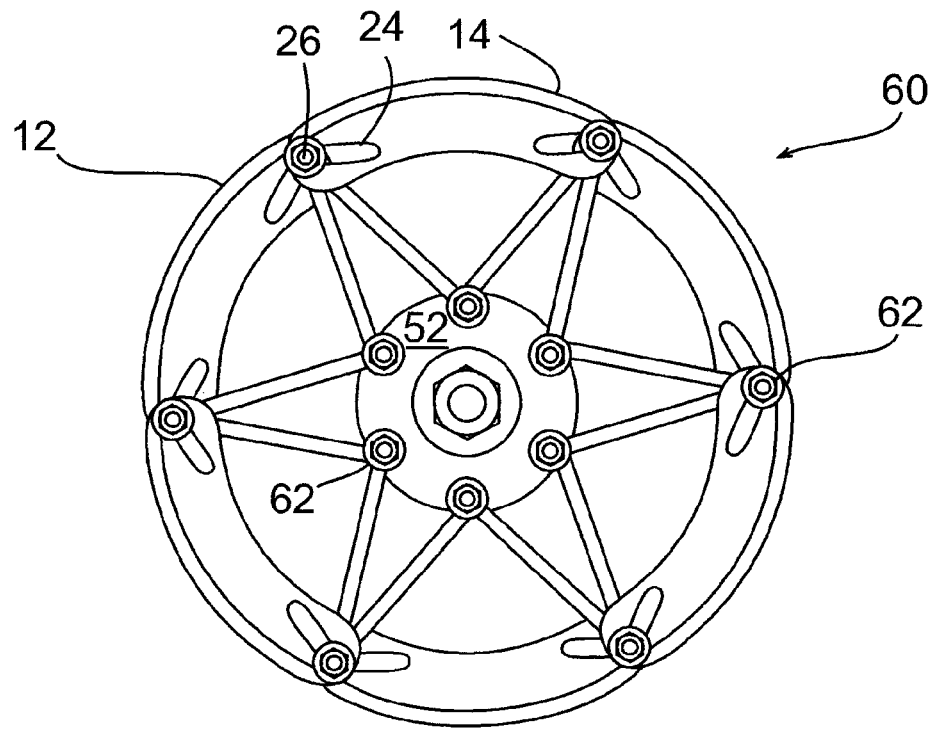
FIG. 14 shows a side elevation view of a radial pipe pig.

A change in diameter of the expandable circumference 14 may be achieved by moving the pressure plates 20, 22 towards each other or away from each other. As the pressure plates 20, 22 move closer together the levers 28 push against the yokes 30 and thereby move the arcuate cleaning elements 12 radially outward. The slits 24 in the arcuate cleaning elements 12 allow the cleaning elements 12 to slide in or out to adjust the diameter of the expandable circumference 14. Longer slits allow for larger diameter changes. When the spring element 18 is in tension and when the pipe pig 10 is placed in the pipe 40 (FIG. 4), the spring element 18 biases the cleaning elements 12 towards internal walls of the pipe 40 (FIG. 4). The force of the spring element 18 may be balanced against the required force to clean tubing without damaging the tubing structure. Referring to FIG. 14, slits 24 may be angled radially inward to facilitate the contraction of the expandable circumference 14 as the pin 26 slides in a slit 24. FIG. 22 illustrates another embodiment of an arcuate cleaning element 12 where slits 24 are instead defined along a partial arc of an imaginary circle, which, when installed, has its center on the pipe pig axis A (shown in FIG. 12).

Figure 1:
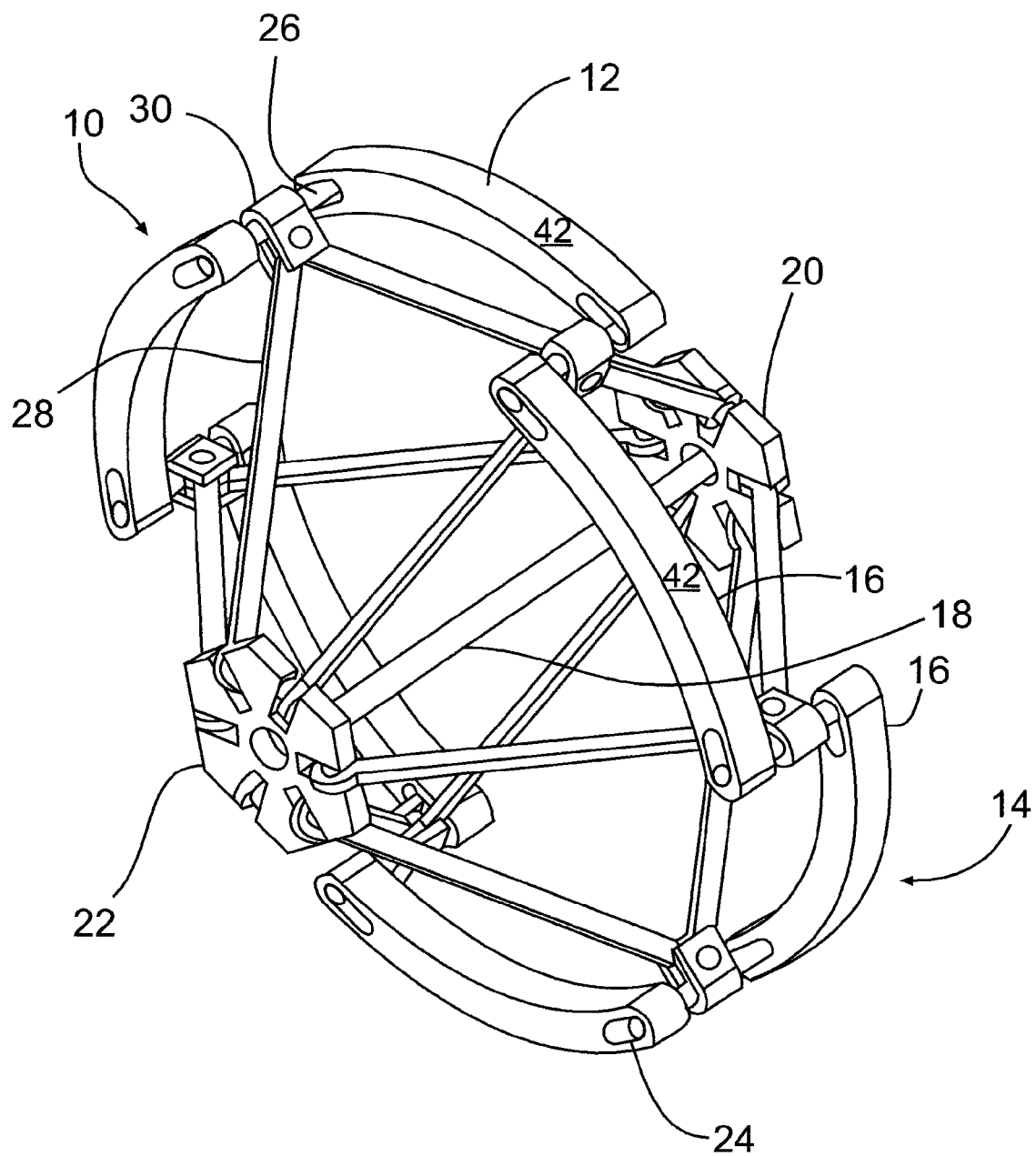
FIG. 1 is a perspective view of a pipe pig in an expanded position.

FIG. 2 shows the pipe pig 10 in a compressed position in which the expandable circumference 14 has a smaller diameter than the expandable circumference 14 in FIG. 1. The arcuate cleaning elements 12 are in a contracted position with the levers 28 lying in the slits 24 closer to the center of the arcuate cleaning elements 12 than shown in FIG. 1. The levers are in an extended position and the respective pressure plates 20, 22 are at a greater distance apart from each other than is shown in FIG. 1. The spring element 18 is in an expanded position.

Figure 10:
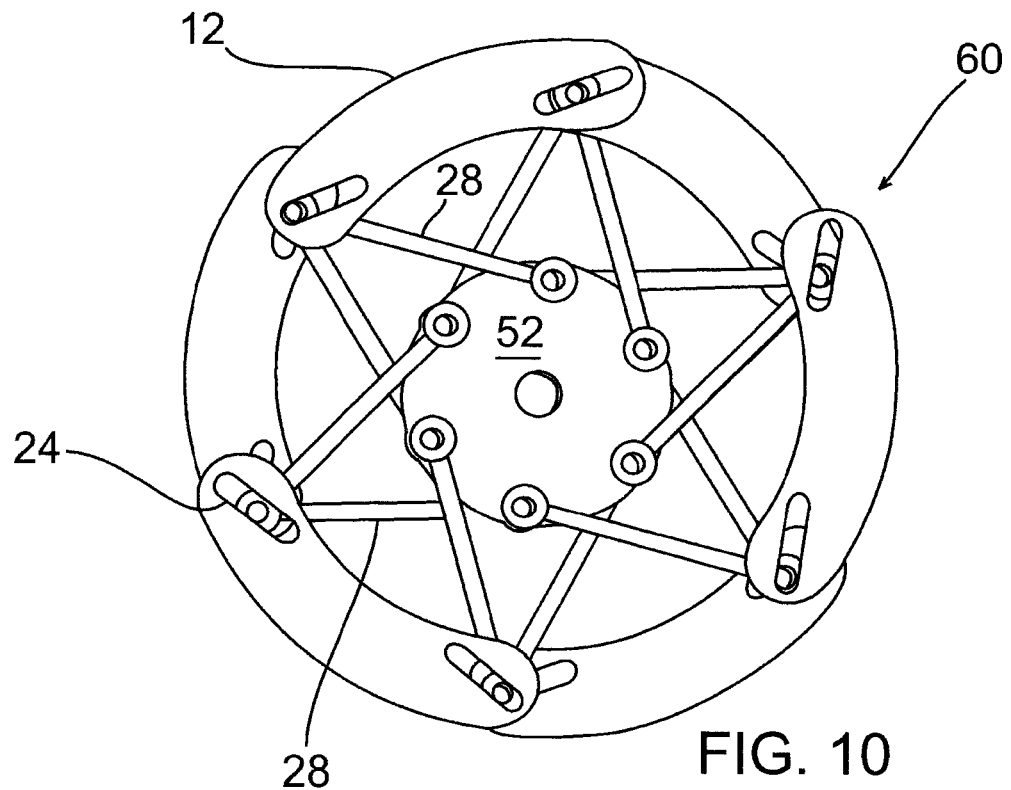
FIG. 10 shows a side elevation view of a radial pipe pig in a contracted position.

The pipe pig 10 is propelled through the pipe 40 (FIG. 4) by fluid forces on the pipe pig 10 as a result of fluid flow. In some embodiments the pipe pig 10 may be less than 200 grams, for example less than 100 g, so that it moves easily through the pipe 40 (FIG. 4). The hollow open structure of the pipe pig 10 allows a low pressure drop across the pipe pig 10 and minimizes the fluid flow disturbance when the pipe pig 10 is placed in the pipe. Referring to FIG. 15, the flow through space between elements 12 and plate 52 may be large enough to prevent a deleterious pressure drop. A low pressure drop for a 4 inch inner diameter pipe may be a drop in pressure of less than 4 psi. Referring to FIG. 10, this may be achieved by providing a pipe pig which has at least 50% open structure for fluid to flow through. In some embodiments, 40-60% open structure is suitable. The pig is able to adapt to changes in diameter of the pipe 40 (FIG. 4), for example such as those resulting from weld beads, by expanding and contracting the expandable circumference 14. For example, a pipe pig for use in a 4.5 inch inner diameter pipe may have an expandable circumference 14 that ranges from 4.5 to 3.75 inches in diameter. The expandable circumference 14 of the pipe pig 10 allows it to traverse through tight 180° bends. Also, the pipe pig 10 has to be sufficiently robust, tough and impact resistant to withstand the impact of entering a sharp bend at a high velocity. When pipe pigs are run through heaters, they may travel through pipes at velocities up to more than 35 m/s. The spring element 18 absorbs impact shock when the arcuate cleaning elements 12 impact an element of the pipe 40 (FIG. 4), such as a caused by the pig making a tight turn or impacting weld beads.

The pressure plates 20, 22 of the pipe pig 10 of this and other embodiments of the pipe pig may be modified to change the pig velocity when the pipe pig 10 operates in the pipe 40 (FIG. 4). A larger area for one or both of the pressure plates 20, 22 generally increases the fluid flow force on the pipe pig 10 and increase the pipe pig 10 velocity. A carefully balanced pipe pig design allows for control over the pig velocity versus the fluid velocity. The pressure plates 20, 22 and the spring element 18 together form a pressure responsive expander. A high fluid velocity may increase the pressure on the pressure plates 20, 22, push the spring element 18 in, increase the force against the tube wall and slow down the pipe pig 10. The opposite occurs when the fluid velocity decreases so that force against the tube wall decreases and the pipe pig 10 has less friction force against the tube wall which reduces the frictional deceleration of the pipe pig. The pressure plates 20, 22 may be designed in such a way that a high fluid force increases the cross-sectional area of the pressure plates 20, 22 as the levers 28 move out, further assisting the slowing down of the pig.

As shown in FIG. 3B, flaps 31 made from suitable material may be connected between the levers 28 and the pressure plates 20, 22. The flaps 31 may form a triangle, with two sides of the flaps 31 being connected to pairs of adjacent levers 28 and the corresponding apex of the triangle of the two sides being connected to one of the pressure plates 20 to which the levers 28 are attached. With the flaps 31 attached to the levers 28, the cross-sectional area of the flaps 31 with respect to the fluid flow is greater when the levers are further away from parallel with respect to the direction of fluid flow than when the levers are closer to parallel with respect to the direction of fluid flow. The pressure plates 20, 22 may also be detachable from the pig so that different sizes of pressure plates 20, 22 may be used for different fluid flow rates. Pig velocity may be controlled by balancing the fluid force with the frictional force imposed by the spring element 18 when biasing the arcuate cleaning elements 12 towards an interior surface 50 (FIG. 4) of the pipe 40 (FIG. 4).

In FIGS. 1 and 2 an exterior surface 42 on the arcuate cleaning elements 12 is shown with a non-serrated surface. When the exterior surface 42 has a smaller contact area with a pipe 40 (FIG. 4) a lower force is required to remove coke from the pipe 40 (FIG. 4). For example, the arcuate cleaning elements 12 may have a textured exterior surface 44, as shown in FIG. 3A, to clean coke from the pipe 40 (FIG. 4). It may be beneficial to connect multiple pigs in series to clean a pipe using a pig with a textured surface because one pig might not be able to cover the entire surface of the interior of the pipe. Multiple pigs provide balance to prevent a single pig from tipping sideways and getting stuck in the pipe. The textured exterior surface 44 may be for example serrated or impregnated with additional cleaning elements to assist in cleaning coke from the pipe 40 (FIG. 4). The serrated exterior surface 44 may be impregnated with poly-crystalline diamond composite or diamond for applications that require a hard exterior surface.

FIG. 4 shows another embodiment of a pipe pig 110 having two sets 132, 134 of arcuate cleaning elements 112. The arcuate cleaning elements 112 together define an expandable circumference. The arcuate cleaning elements each have scraping edges 116. A spring element 118 connects pressure plates 120, 122. A pin 126 connects linked pairs of arcuate cleaning elements on each set of arcuate cleaning elements 112 and connects arcuate cleaning elements a first set arcuate cleaning elements 132 to a second set of arcuate cleaning elements 112. Levers 128 connect the pressure plates 120 and 122 to yokes 130 on the arcuate cleaning elements 112. The pins 126 shown in this embodiment are longer than the pins 26 shown in FIGS. 1-3. The use of two sets 132, 134 of arcuate cleaning elements 112 increases the cleaning area of the pipe pig 110. The use of two sets 132, 134 may also increase the stability of the pipe pig 110.

FIG. 4 also shows the pipe pig 110 in a pipe 40. The pipe 40 may be tubing for a heater or a heat exchanger. The pipe has an inlet 46 and an outlet 48, and fluid in the pipe flows from the inlet 46 to the outlet 48. The pipe 40 has an interior surface 50. The pipe pig 110 is run through the pipe 40 from the inlet 46 to the outlet 48 and the scraping edges 116 of the arcuate cleaning elements 112 clean deposits, such as coke, from the interior surface 50 of the pipe 40. Pressure from the flow of fluid in the pipe 40 push the cleaning elements 22 towards the arcuate cleaning elements 112 which in turn pushes the arcuate cleaning elements 212 towards the interior surface 50 of the pipe 40.

Figure 5:
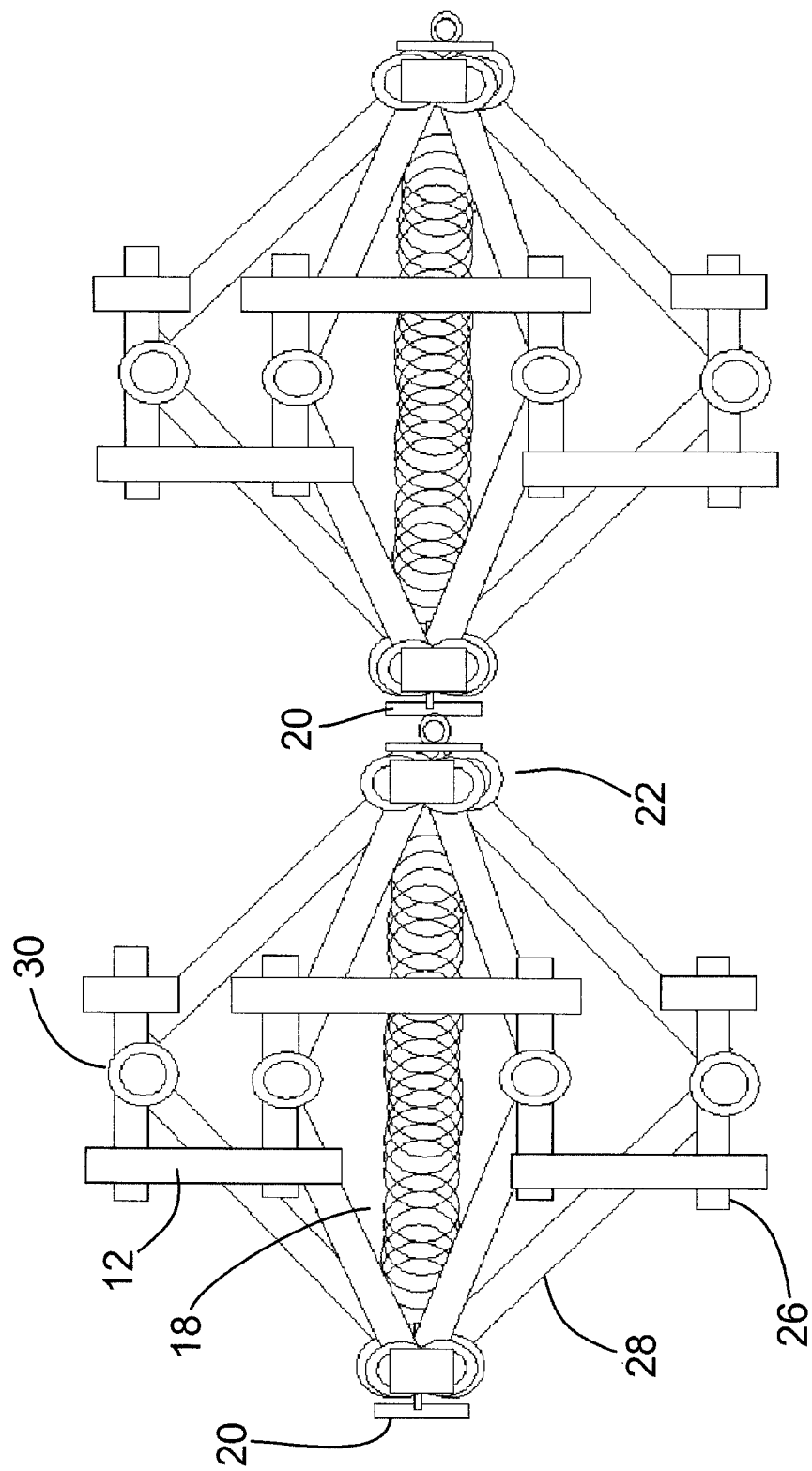
FIG. 5 is a side view of two pipe pigs of the embodiment of FIG. 1 attached side-by-side.
Figure 23:
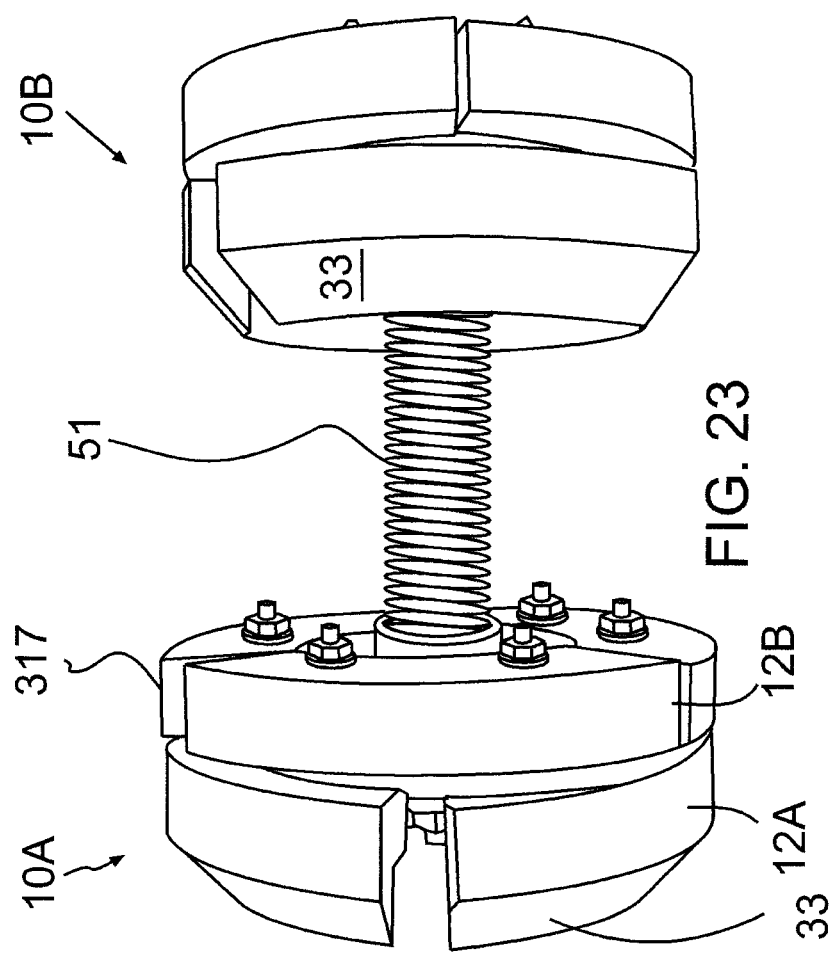
FIG. 23 shows a side perspective view of a pipe pig connected in series to a second pipe pig.

FIG. 5 shows two pipe pigs 10 connected in series. Several pigs may be connected in series to promote the stability of the pig when moving around bends. As shown in FIG. 5, the pressure plate 20 from a first pipe pig is connected to the pressure plate 22 from a second pipe pig. In some embodiments, several pigs may be connected in series using flexible rods connecting the arcuate cleaning elements of a first pipe pig to the arcuate cleaning elements of a second pipe pig. In some embodiments, a first and second pipe pig may be connected by a connector attached between a pressure plate of the first pipe pig to a pressure plate of the second pipe pig. The connector may be either rigid or flexible. Referring to FIG. 23, two pipe pigs 10A and 10B are illustrated as being connected by a spring element 51. The spring element 51 is able to flex in axial as well as radial directions, allowing the pig assembly to smoothly navigate around bends in the pipe.

Figure 6:
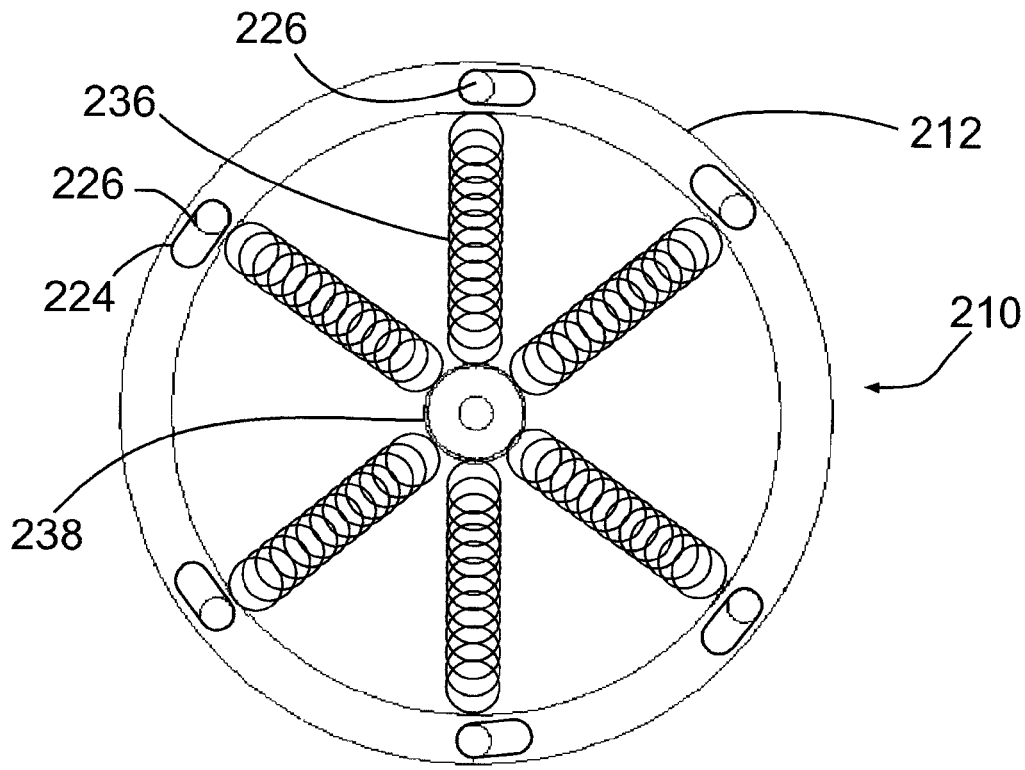
FIG. 6 is an end view of a pipe pig having multiple spring elements.

FIG. 6 shows a pipe pig 210 with multiple spring elements 236. Arcuate cleaning elements 212 are connected to linked arcuate cleaning elements 212 by pins 226 through slits 224 to form sliding pin joints between each of the linked arcuate cleaning elements 212. Six spring elements 236 connect between a pressure plate 238 to pins 226 by yokes (not shown). The pressure plate 238 lies at the center of an expandable circumference defined by the arcuate cleaning elements 212. The spring elements 236 bias the arcuate cleaning elements 212 radially outward from the pressure plate 238. The pressure plate 238 and the spring elements 236 together form a pressure responsive expander.

Figure 7:
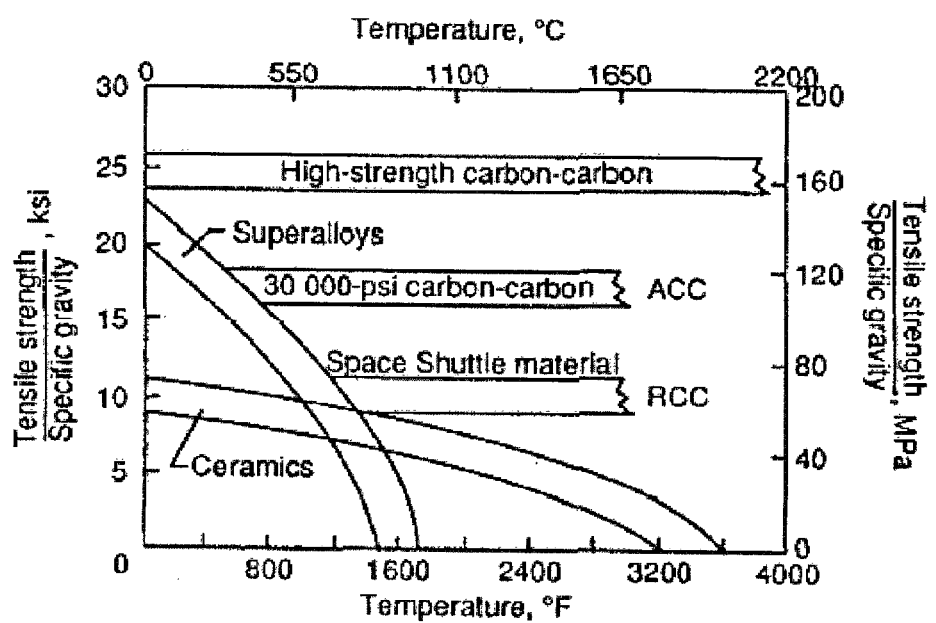
FIG. 7 shows the tensile strength to specific gravity ratios of varies substances at different temperatures.

FIG. 7 shows a graph representing the strengths of various materials at different temperatures. The strength of the materials is represented by the tensile strength divided by the specific gravity of each of the materials. The specific gravity of a substance is the ratio of the density of the substance relative to the density of water. The graph shows that the tensile strength of ceramics and superalloys decrease as temperatures increase. Carbon-carbon composites, such as reinforced carbon-carbon (RCC), 30 000-psi carbon-carbon and high-strength carbon-carbon can maintain their tensile strength up to temperatures of 2000 C. Carbon-carbon composites (CCC) comprise of a fibrous carbon substrate in a carbon matrix. CCCs are generally low density, with typical values between 1.3 and 1.8 g/cm$^3$. The strength at high temperatures and low density of the carbon-carbon composites make the composites particularly suitable as a material for the arcuate cleaning elements in some embodiments.

Figure 8:
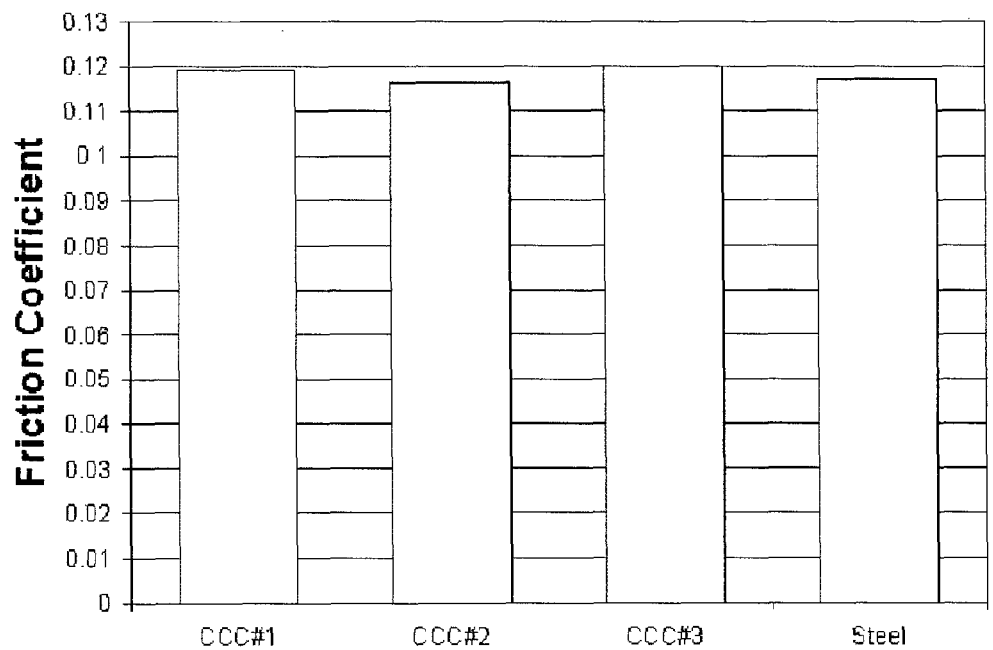
FIG. 8 shows the coefficient of friction between various samples of carbon-carbon composites and steel.

FIG. 8 shows a graph representing the friction of coefficient for various samples of CCCs and steel. The graph shows that for various different samples of CCCs there may be little difference in the friction coefficient of the CCCs and a steel sample. The CCCs have similar friction coefficient to steel, despite the CCCs being lower in density. In some embodiments where low density material is preferred, then the CCCs are suitable as a material for the arcuate cleaning elements.

Figure 9:
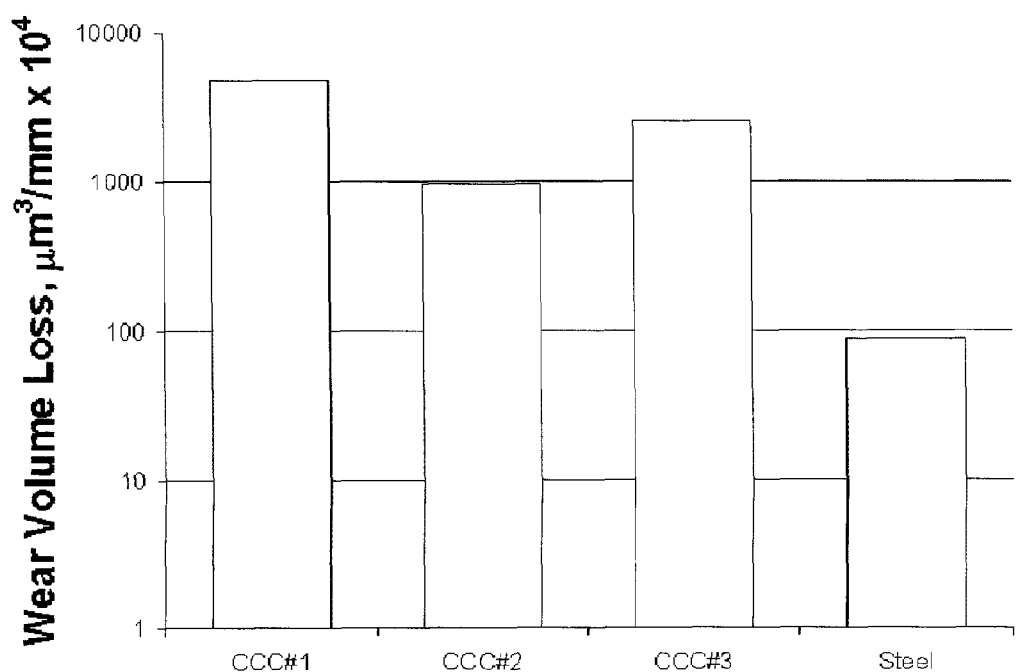
FIG. 9 shows the wear volume loss of various samples of carbon-carbon composites and steel.

FIG. 9 shows a graph representing the wear volume loss of various samples of CCCs and steel. The CCCs shown have a lower wear resistance than the steel samples at high loads. In the tests performed the loads were greater than 10 N/mm$^2$. For the same CCC samples, no wear was observed during testing at a 2 N/mm$^2$ load. The contact load for the arcuate cleaning elements 12 during operation of the pipe pig 10 in many cases is less than 0.5 N/mm$^2$. Therefore, only minimal wear of the CCC samples occurs for the arcuate cleaning elements 12 during operation of the pipe pig 10.

Figure 11:
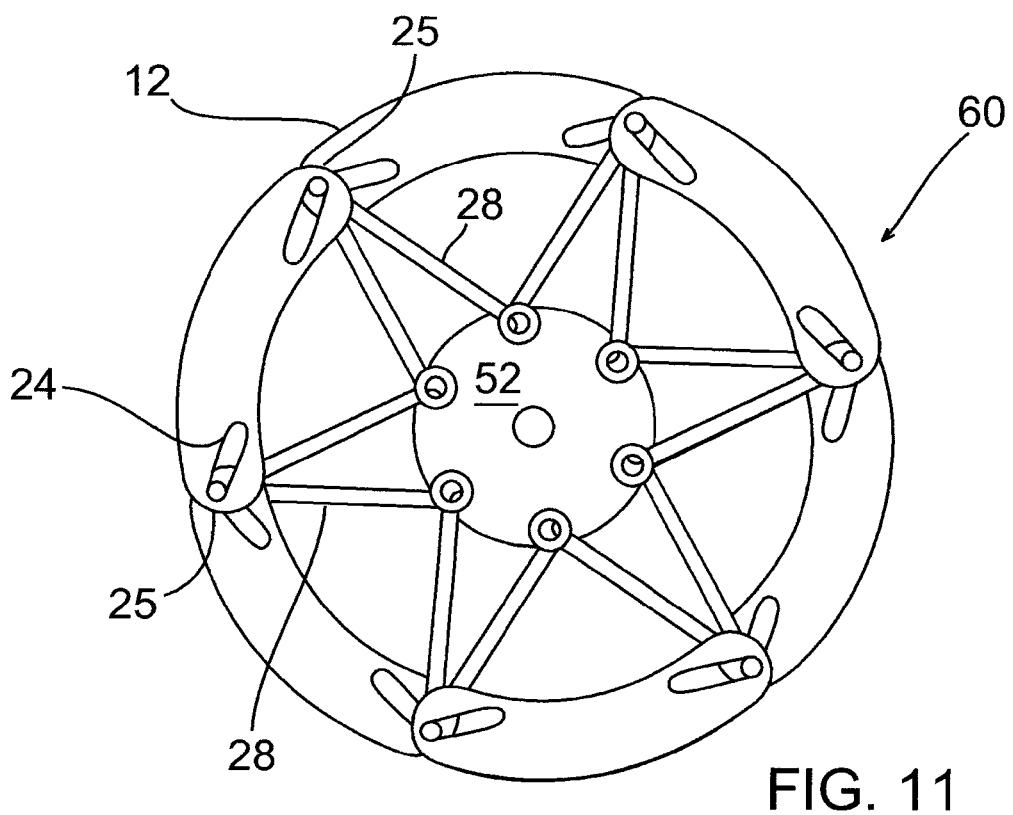
FIG. 11 shows a side elevation view of a radial pipe pig in an expanded position.
Figure 12:
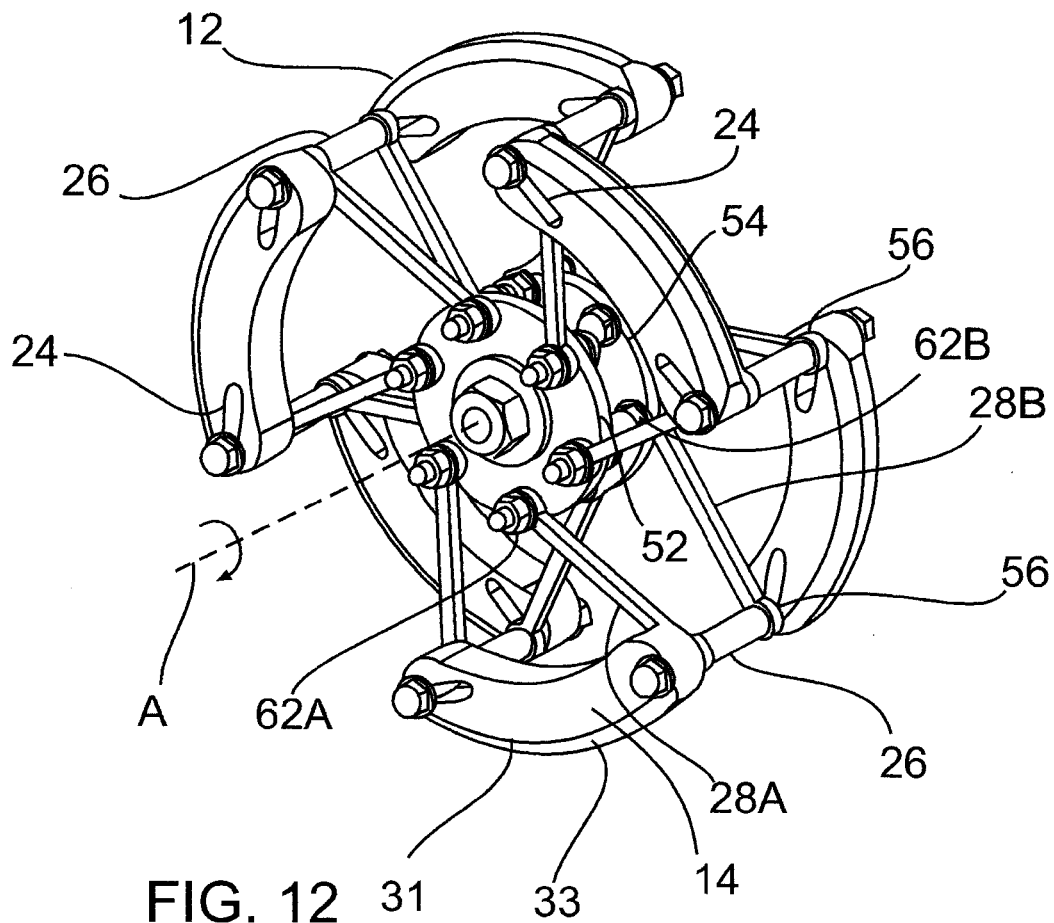
FIG. 12 shows a perspective view of a radial pipe pig.
Figure 13:
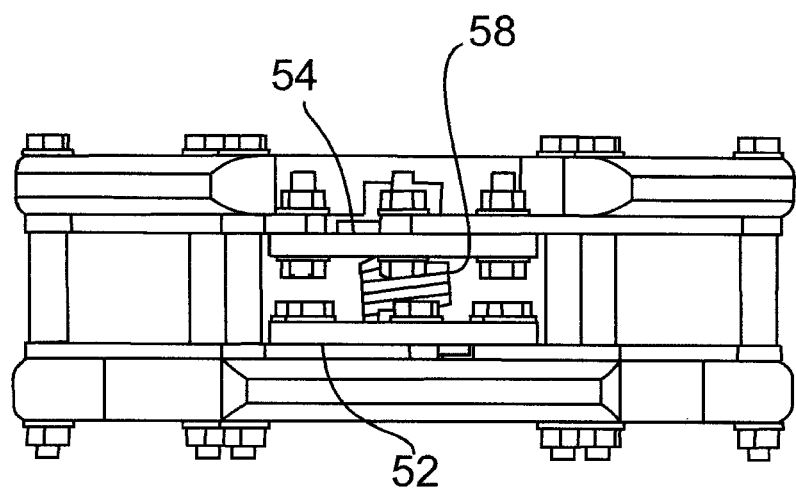
FIG. 13 shows a side view of a radial pipe pig with a torsion spring.

FIGS. 10-14 show an embodiment of a radial pipe pig 60. The radial pipe pig 60 is similar in design to the pipe pig 10 shown in FIGS. 1-3B, except that instead of pressure plates, the radial pipe pig 10 has respective radial plates 52, 54 (FIG. 12) spring biased to rotate with respect to one another. This allows, in operation, the expandable circumference to expand and contract in response to varying radial pressure on the expandable circumference. The radial pipe pig design may be advantageous over the design of FIGS. 1-5 in that the radial pipe pig design allows the length of the pipe pig, or a series of pipe pigs, to be reduced. As shown in FIG. 13, the radial plates 52 and 54 are connected by a spring element, for example torsion spring 58, the spring element biasing the arcuate elements radially outward. The torsion spring 58 biases the arcuate cleaning elements 12 into an expanded position. Relative movement of the radial plates 52, 54 causes expansion and contraction of the exterior circumference of the pig 60. In operation, the radial pipe pig 60 may start in an expanded position, such as shown in FIG. 11. As pressure on the arcuate cleaning elements 12 increases, the force may eventually become greater than the restoring force provided by the torsion spring 58 (FIG. 13) and the exterior circumference of the pig 60 will contract. The radial pipe pig 60 is shown in a contracted position in FIG. 10. The radial plates 52, 54 may also be connected by a spring that, besides providing tortional resistance to compression, is also sensitive to pressure in a pipe to bias the arcuate cleaning elements radially outward.

For ease of explanation, the rotation of the radial plates 52, 54 are described as if the radial plate 52 is rotating and the radial plate 54 is stationary. Rotational movement of the radial plate 52 causes the levers 28 to pull the arcuate cleaning elements 12 radially inward towards the radial plate 52. The levers 28 that are connected to the radial plate 54 (FIG. 13) are also pulled radially inward while the end of the levers that are connected to the radial plate 54 remain fixed relative to the radial plate 54. As a result, the two pairs of levers 28 that connect to a single pin 26 (FIG. 12) form a larger angle in an expanded position shown in FIG. 10 than in a contracted position as shown in FIG. 11. This means that the apex of the angle of the two pairs of levers 28 in FIG. 10, which corresponds to the location of the arcuate cleaning element 12, is radially closer to the radial plates 52, 54 in FIG. 10 than in FIG. 11. The rotation of the radial plate 52 may also cause the arcuate cleaning elements 12 to rotate around the exterior circumference of the pig 60 relative to the radial plate 54.

The contraction of the radial pipe pig will now be described with respect to two levers 28A and 28B as shown in FIG. 12. Levers 28A and 28B are attached to a pin 26. Lever 28A is connected to radial plate 52 at a position 62A and lever 28B is connected to radial plate 54 at a position 62B. At the initial position shown in FIG. 12, position 62A is approximately 60 degrees clockwise around axis A beyond position 62B. As radial plate 52 rotates with respect to radial plate 54, the position 62A will advance with the radial plate 52 and so the angle between the positions 62A and 62B with respect to axis A will increase. The pin 26 connected to levers 28A and 28B will lie in a radial position around axis A approximately halfway between the positions 62A and 62B. As the radial distance between positions 28A and 28B increases, the pin 26 will lie closer to the central axis A, meaning that arcuate cleaning elements 12 lie closer to the central axis A.

As shown in FIG. 12, each lever 28 may connect by a loop 56 to the pins 26. The pins 26, as in the embodiment shown in FIG. 1, move freely within the slits 24. FIG. 14 shows the radial pipe pig 60 with bolts 62 securing the levers 28 to the radial plates 52, 54 and the pins 26 (FIG. 12).

Referring to FIG. 11, in some embodiments the slits 24 terminate substantially at the ends 25 of an element 12. Referring to FIG. 15, by increasing the spacing between slits 24 and the ends 25 of an element 12, the separation X between, for example, leading elements 12A or trailing elements 12B may be reduced. This allows more overlap between leading elements 12A and trailing elements 12B.

Figure 18:
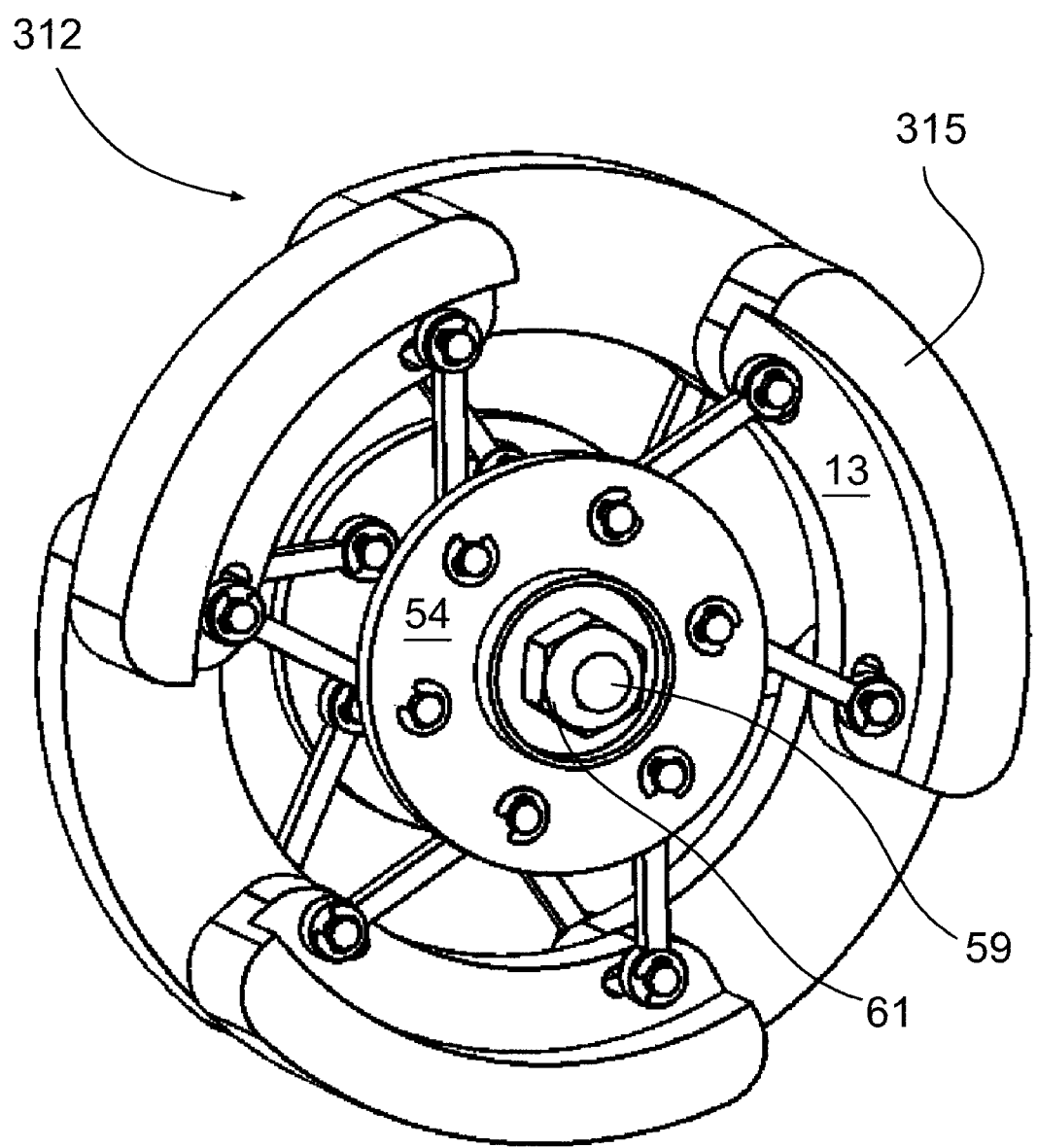
FIG. 18 shows a perspective view of the trailing end of the radial pipe pig of FIG. 15.

In other embodiments, at least some of the arcuate cleaning elements 12 may lie internally to the loops 56. An example of a pipe pig 312 with this feature is shown in FIGS. 15 and 16. Referring to FIG. 16, in this embodiment, the distance between leading arcuate cleaning elements 313 and trailing arcuate cleaning elements 315 is reduced, and the leading and trailing elements may even lie contiguously to one another. As before, the adjacent arcuate cleaning elements have corresponding slits 24 connected directly by pins 26. Reducing the distance between adjacent elements 12 may make the radial pipe pig 60 narrower and easier to move around bends. Also, this internal configuration of arcuate cleaning elements may be advantageous with multiple radial pipe pigs connected in a train. Referring to FIGS. 16 and 18, the trailing elements 315 may also lie internally to loops 56. Referring to FIG. 23, an embodiment is shown where the trailing elements 317 of pipe pig 10A lie external to loops 56 (not shown). Referring to FIGS. 16 and 17, the loops 56 may be inset within an indented portion 13 of elements 12, thus allowing a reduction in the axial width of the pipe pig 312 without having to reduce the axial width 15 of the elements 12.

Referring to FIG. 17, plates 52 and 54 may be connected via a torsion spring (not shown), and may be spaced relative to one another using a spacer 53 (also shown in FIG. 19). Referring to FIG. 16, an axle, such as a bolt 59 and nut 61 (shown in FIGS. 17 and 18), may secure the plates 52 and 54 (shown in FIG. 17) together. Referring to FIG. 16, pins 26 may be secured within slits 24 using suitable elements such as spring or retainer clips 55. In some cases retainer clips 55 are advantageous over nuts as clips 55 may be less easily loosened during use. Also, nuts and bolts may seize up after multiple compressions. It is understood that there are many suitable styles of retainer clips that may be used for this purpose. Referring to FIG. 21, a suitable pin 26 for use with a retainer clip (not shown) may have a clip indent 57 at each end for a retainer clip to snap into. Referring to FIG. 16, one or more of a larger loop 56 or washers (not shown) between loops 56 and elements 12 may be used in order to facilitate compression. Various spacers (not shown) on the pins 26 between the levers 28 and elements 12 or plates 52 may be present Referring to FIGS. 12, 16, and 17, the expandable circumference 14 may have an outward taper 33 from a leading edge 31 of the expandable circumference 14. Referring to FIG. 23, at least the leading arcuate elements 12A in a pipe pig may incorporate this feature. This allows the pipe pig to navigate narrower portions of pipe, such as when passing over a weld bead or a tight bend, without jamming in the pipe. Outward taper 33, which may be a 45 degree taper, may also function as a pressure responsive element in coordination with the respective plates as longitudinal pressure against the taper 33 is converted into radial compression pressure.

Various different combinations of pipe pigs may be connected in series, for example, a radial pipe pig 60 (FIG. 12) may be connected in series to a pipe pig 10 (FIG. 1). Also, more than two pigs may be connected to create a series of pigs.

In some embodiments, the elements 12 do not to have a sharp leading edge at the largest outer circumference of the pipe pig, in order to prevent fracturing when colliding with weld beads during travel.

Table 1 shows the density, yield strength, ultimate strength and the yield strength-to-density ratios of various steels and titanium alloys. Most materials have temperature limitations or high densities that make them unsuitable for use as a pipe pig. In some applications titanium alloys with an α or α+β structure and precipitation hardened stainless steels are suitable for use at temperatures of 400-500 C. The strength and elastic modulus is equivalent for titanium and precipitation hardened stainless steel. Table 1 shows Ti-6Al-4V, which is an α+β titanium alloy that is commercially available in the form of sheet or wire.

TABLE 1

| Materials | Density (g/cm$^3$) | σ$_{0.2}$ (MPa) | UTS (MPa) | Yield strength-to density ratio |
|---|---|---|---|---|
| Martensitic stainless steels | 7.9 | 380-600 | 420-700 | 4.8-7.8 |
| Austenitic stainless steels | 7.9 | 210-350 | 400-700 | 2.6-4.4 |
| Precipitation hardened stainless steels | 7.9 | 900-1100 | 1100-1400 | 11.3-13.7 |
| Ti—6Al—4V | 4.7 | 550 | 700 | 12.0 |

Materials for the structural components, such as the spring element and the levers, of the pipe pig shown in the various embodiments may be, for example, precipitation hardened stainless steels or titanium alloys with an α or a α+β structure, for example Ti-6Al-4V. Cheaper alternatives to titanium alloys, such as 17-7PH stainless steel, are commercially available spring alloys that have similar strength-to-density ratios as titanium alloys. Other materials with a similar or higher strength to weight ratio and elasticity may also be used depending on the application. Other materials, such as shape memory alloys, may become more suitable when alloys are developed with high temperature functionality. In an embodiment made from suitable materials, such as Ti-6Al-4V or 17-7PH stainless steel structural and spring materials, the weight of the pig may be no more than 180 g.

The arcuate cleaning elements shown in the various embodiments may be constructed from a material that is compatible with the operating fluid as the arcuate cleaning elements are subjected to some degree of wear from operation of the fluid. In the case of a heater in a refinery, the scraping edges of the pig are chosen to be hard enough to remove the coke from the tubing surface without damaging the underlying material. CCCs may be used as material for the arcuate cleaning elements. CCCs have a high strength to density ratio, acceptable wear resistance and present no contamination problems. Also, the low hardness of carbon materials may reduce the wear damage to the pipe material, such as for example steel, underlying the coke deposit. Other materials with similar properties may also be used for the arcuate cleaning elements.

Referring to FIG. 22, an exemplary cleaning element 12 has an arcuate body 320 having a scraping edge 16 on an outer circumferential surface 322 of the arcuate body 320. One of the axial slits 24A is near an end 25A of an arc defined by the arcuate body 320, and another of the axial slits 24B is near the other end 25B of the arc, the axial slits 24 being for receiving sliding pin joints (not shown).

Although six arcuate cleaning elements are shown in FIGS. 1-3, various other numbers of arcuate cleaning elements may be used in other embodiments. The six arcuate cleaning elements are symmetrical in orientation. That is, the arcuate cleaning elements have centers that are separated by intervals of 360/6=60 degrees around the expandable circumference 14. In other embodiments in which the pipe pig has a number N of arcuate cleaning elements, the arcuate cleaning elements may have centers that are separated by intervals of 360/N degrees around the expandable circumference.

Additional sets of arcuate cleaning elements may be added to the pig design, for example two sets of arcuate cleaning elements may be used as shown in FIG. 4. More than two sets of arcuate cleaning elements may also be used. In some embodiments the arcuate cleaning elements may be embedded within one another. In some embodiments the arcuate cleaning elements may form a spiral shape, with each successive linked arcuate cleaning element lying closer to the inlet of the pipe than the previous element. In an embodiment the spiral shaped arcuate cleaning elements may connect between two sets of circular arcuate cleaning elements.

The spring element shown in the various embodiments may be any element with elastic properties. The spring element may also connect the arcuate cleaning elements together directly, for example, with a spring element connecting each linked pair of arcuate cleaning elements together. In some embodiments the pressure plates may be various different shapes provided that the pressure plate is responsive to pressure in the pipe. The pressure plate may be, for example, annular, circular, or a regular polygon. The diameter of the expandable circumference in the various embodiments may be adapted for different sizes of pipe. Frequent pigging, for example once every 1-10 days, helps prevent contamination such as dense coke formation in the pipe.

The pipe cleaning pig may be used to clean other types of deposits from pipes. For example, a possible use for the pipe pig is the cleaning of pipes in a milk or chocolate processor, where the temperature is lower. The materials for the arcuate cleaning elements, the spring element and the frame elements may be chosen according to characteristics of the particular application. For example, materials for use in a low temperature application may have lower temperature limits. Also, cleaning materials used to clean other types of deposits may be chosen according to the hardness of the material being cleaned and the adhesive strength of the deposit. For example, softer deposits, such as hardened milk or chocolate products, may be cleaned with material with lower hardness characteristics than the materials used to cleaning coking deposits.

Immaterial modifications may be made to the embodiments described here without departing from what is covered by the claims.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A pipe pig with a pipe pig axis, the pipe pig comprising:

arcuate cleaning elements forming an expandable circumference, each of the arcuate cleaning elements having at least one scraping edge, in which the arcuate cleaning elements form linked pairs of arcuate cleaning elements connected by sliding pin joints, each sliding pin joint having a pin received to slide along a pin guide in a path perpendicular to a pin axis, the pin axis being parallel with the pipe pig axis; and a pressure responsive expander comprising a set of levers connected to the arcuate cleaning elements via yokes, the levers being spring biased to cause, in operation, the expandable circumference to expand and contract in response to varying pressure on the pressure responsive expander.

2. The pipe pig of claim 1 in which the pressure responsive expander further comprises:

respective pressure plates spaced axially on opposed sides of the expandable circumference, the respective pressure plates being connected by the levers to the arcuate cleaning elements.

3. The pipe pig of claim 2 in which the levers are spring biased by a spring element connecting the respective pressure plates together.

4. The pipe pig of claim 3 in which the spring element and levers are made from titanium alloys.

5. The pipe pig of any one of claim 1-4 in which the arcuate cleaning elements are made from a carbon-carbon composite material.

6. The pipe pig of any one of claim 1-4 in which the expandable circumference has an outward taper from a leading edge of the expandable circumference.

7. The pipe pig of claim 1 in which the arcuate cleaning elements are connected to the yokes via the pins.

* * * * *